Sept. 3, 1929.                R. PUDELKO                1,726,765

ELECTRICITY METER

Filed Feb. 18, 1928

INVENTOR
R. Pudelko
BY John A. Morgan
ATTORNEY

Patented Sept. 3, 1929.

1,726,765

UNITED STATES PATENT OFFICE.

RICCARD PUDELKO, OF ZUG, SWITZERLAND, ASSIGNOR TO LANDIS & GYR, A.-G., A JOINT-STOCK COMPANY OF SWITZERLAND.

ELECTRICITY METER.

Application filed February 18, 1928, Serial No. 255,434, and in Switzerland February 21, 1927.

The invention relates to electricity meters and more particularly to a new and useful arrangement and construction of the terminal chamber of such a meter whereby the introduction of any desired current-limiting device into the meter circuit is made possible.

Objects and advantages of the invention will be set forth in part hereinafter and in part will be obvious herefrom, or may be learned by practice with the invention, the same being realized and attained by means of the instrumentalities and combinations pointed out in the appended claims.

The invention consists in the novel parts, construction, arrangements, combinations and improvements herein shown and described.

The accompanying drawings, referred to herein and constituting a part hereof, illustrate one embodiment of the invention, and together with the description, serve to explain the principles of the invention.

Figure 1:
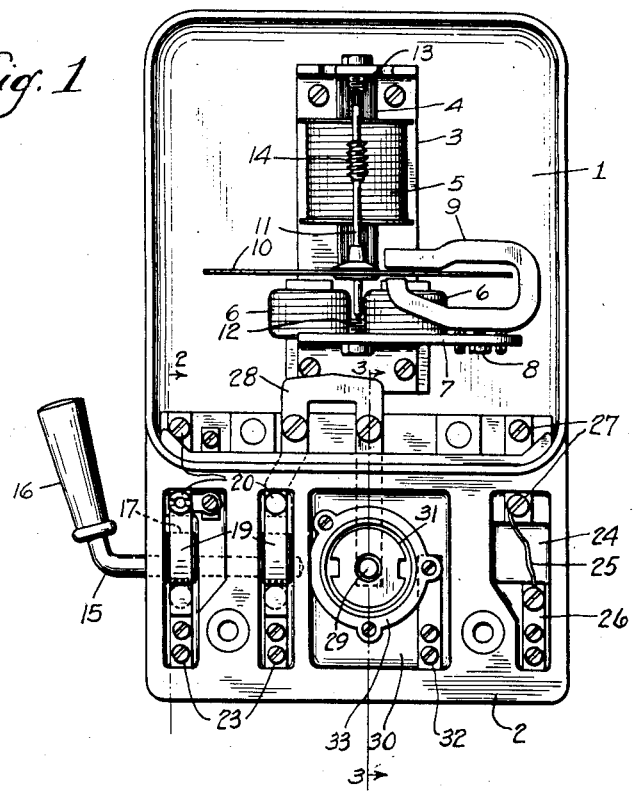
Fig. 1 is a plan view from above of an electricity meter with the cover removed showing a preferred embodiment of the invention.

The invention is directed to constructing an electricity meter and preferably the terminal chamber thereof so that any desired current-limiting device, such as a fuse or automatic cut out, can be readily introduced into the meter circuit, while at the same time permitting the use of the usual hand-switch in the terminal chamber.

In the construction of meter heretofore in use, the solution of the problem of incorporating into the meter, and particularly in the terminal block or chamber thereof, a current-limiting or protecting device which prevents over-loading of the meter, together with a hand-switch, it has been necessary to make a special type of terminal chamber for every different kind of current-limiting device. This resulted in a number of complicated terminal constructions which were built to make the meter conform to the current-limiting device employed. In order to use a certain kind of current-limiting device, the consumer was forced to purchase the terminal chamber which had been specially constructed for the device in question.

The present invention permits the use of any known type of current-limiting means in the terminal chamber of an electricity meter, the terminal chamber being formed so that it is practically universally adapted without change for the installation of any desired protecting device which the consumer may wish to use. Furthermore, the installation of the protecting device may be made without interfering in any way with the operation or construction of the hand switch of the terminal chamber.

According to the present preferred embodiment of the invention the terminal chamber of an electricity meter has arranged in series with the hand switch a standard connection base or socket which permits the employment of any of the usual kinds of current-limiting devices and their ready replacement and interchangeability. It will be understood, however, that the present invention is not limited to the use of such a standard socket but is intended to cover any similar device which permits of the same facility in the use and interchangeability of protecting devices in a meter circuit.

It will be understood that the foregoing general and likewise the following detailed description are exemplary and explanatory of the invention, but are not restrictive thereof.

Referring now in detail to the embodiment of the invention illustrated by way of example in the acocmpanying drawings, the base plate 1 of the meter has the terminal block 2 secured thereto in any suitable manner. The mechanism of the meter proper, which forms no necessary part of the present invention, may be of the usual Landis & Gyr or other well known construction. As shown, a general supporting bracket 3 is suitably fixed to the base plate and supports the pressure core 4, the pressure coil 5, and the series coils 6. A bracket 7 extending from supporting bracket 3 has an adjustably rotatable bearing 8 for supporting the brake magnet 9. The meter disc 10 which lies between the terminals and the brake magnet 9 is adapted to rotate vertically disposed shaft 11 which is supported above and below by suitable bearings 13 and 12 respectively and which carries the worm 14 for the drive of the meter register (not shown).

Referring now to the terminal chamber 2 of the meter, a switch is provided for opening and closing the meter circuit, which, as embodied, comprises horizontally disposed, rotatable shaft 15 suitably journaled in the side of the terminal block 2 and having a handle 16. Shaft 15 is provided with two parallel cam members 17 adapted to turn in the space 18 provided for them in the terminal chamber. Parallel spring members 19 are fastened at one end to the contact member 20, said member being imbedded in the body of the terminal block 2. The other ends of spring members 19 are unfastened and are provided with contact parts 21 which are forced against cooperating contact parts 22 by the normal spring tension. Contacts 22 form part of current-conducting terminals 23 imbedded in the terminal block 2 and serving for connection of the meter to the line.

Figure 2:
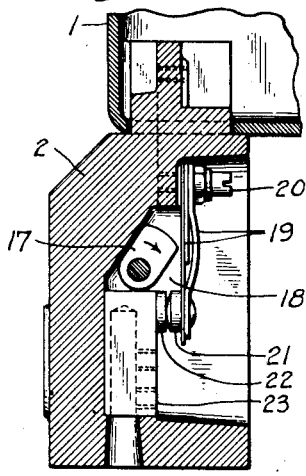
Fig. 2 is a fragmentary vertical section somewhat enlarged along line 2—2 of Fig. 1.
Figure 3:
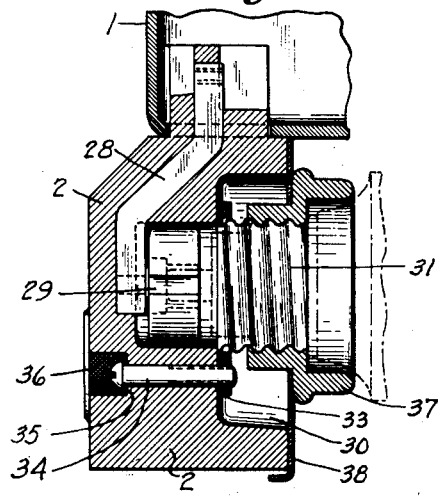
Fig. 3 is a similar fragmentary vertical section along line 3—3 of Fig. 1.

With the hand switch in the position shown in Fig. 2, the cam members 17 are out of contact with springs 19 so that contact parts 21 and 22 rest against each other and the circuit which feeds the meter is closed. When, however, handle 16 and shaft 15 are turned in the direction of the arrow, cam members 17 will lift springs 19, thereby breaking the meter circuit.

The embodied form of the invention comprises current-limiting or protective means permanently fixed in one branch circuit of the meter. As embodied, terminal block 2 is provided with a cavity 24 in which is disposed a fuse wire 25 of lead or other suitable material which is fixed at one end to branch terminal 26 suitably set in the terminal block and at its other end to contact block 27.

In carrying out the preferred embodiment of the invention, terminal 20 of switch 15 is connected in series with the current limiting supporting mechanism of the invention. As embodied, contact member 28, also imbedded in the terminal block, is provided with a contact 29 which is positioned at the bottom of a centrally disposed recess 30 in the terminal block, the other end of member 28 being connected to terminal 20 of the switch. A standard socket 31 is seated in recess 30 and is electrically connected to a terminal sleeve member 32, similar to terminals 23 and 26.

The socket 31 may be suitably supported in the cavity 30 by means of the usual porcelain insulating ring 37 having a flange which bears against an ordinary terminal block cover 38.

It will be evident from the foregoing that any type of current limiting means such as an ordinary fuse or an automatic cut-out fuse may be inserted into the socket and thereby form a protective connection between the switch terminals and the terminal 26. The fuse wire 25 serves as an additional protection in the event that the means used in the socket fail to function.

The invention in its broader aspects is not limited to the specific mechanisms shown and described but departures may be made therefrom within the scope of the accompanying claims without departing from the principles of the invention and without sacrificing its chief advantages.

What I claim is:—

1. In a terminal chamber for an electricity meter, having a terminal circuit, the combination of a switch and a socket in series therewith whereby a current limiting means may be introduced into the terminal circuit.

2. In a terminal chamber for an electricity meter having a terminal circuit, the combination of a switch and a socket in series therewith whereby a current limiting means may be introduced into the terminal circuit and additional current limiting means permanently in the circuit.

3. In a terminal chamber for an electricity meter having a terminal circuit, the combination of a hand switch, and means in the circuit for supporting current limiting means whereby a current limiting means may be introduced into the terminal circuit to close a gap therein.

4. In a terminal chamber for an electricity meter having a terminal circuit, the combination of a hand switch and a standard socket for permitting the closing of a gap in the circuit with current limiting means, said switch and socket being in series in the terminal circuit of the meter.

5. In a terminal chamber for an electricity meter having a terminal circuit, the combination of a hand switch, a standard socket for permitting closure of a gap in the circuit with current limiting means, and a fuse permanently in the circuit, said switch and socket being in series in the terminal circuit of the meter.

6. In a terminal chamber for an electricity meter having a terminal circuit, the combination of a hand switch, a standard socket for permitting introduction of a fuse to close a gap in series with the switch and a fuse permanently in the terminal circuit of the meter.

In testimony whereof, I have signed my name to this specification.

RICCARD PUDELKO.